United States Patent
Li et al.

(10) Patent No.: US 10,197,777 B2
(45) Date of Patent: Feb. 5, 2019

(54) OPTICAL LENS

(71) Applicant: HAN'S LASER TECHNOLOGY INDUSTRY GROUP CO., LTD., Shenzhen, Guangdong (CN)

(72) Inventors: Jiaying Li, Guangdong (CN); Chaoming Zhou, Guangdong (CN); Bo Sun, Guangdong (CN); Yuqing Chen, Guangdong (CN); Yunfeng Gao, Guangdong (CN)

(73) Assignee: HAN'S LASER TECHNOLOGY INDUSTRY GROUP CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/324,055

(22) PCT Filed: Aug. 29, 2014

(86) PCT No.: PCT/CN2014/085465
§ 371 (c)(1),
(2) Date: Jan. 5, 2017

(87) PCT Pub. No.: WO2016/029414
PCT Pub. Date: Mar. 3, 2016

(65) Prior Publication Data
US 2017/0205608 A1    Jul. 20, 2017

(51) Int. Cl.
G02B 13/14 (2006.01)
(52) U.S. Cl.
CPC ........... G02B 13/14 (2013.01); G02B 13/146 (2013.01)
(58) Field of Classification Search
CPC ...... G02B 13/14; G02B 13/143; G02B 13/18; G02B 13/02; G02B 13/04; G02B 15/177; G02B 9/60; G02B 9/34; G02B 13/146
(Continued)

(56) References Cited

U.S. PATENT DOCUMENTS 2,855,824 A * 10/1958 Schade .................. G02B 13/04
359/663
2011/0316969 A1   12/2011 Hsieh et al.

FOREIGN PATENT DOCUMENTS

CN         101587232        11/2009
CN         202102166        1/2012
(Continued)

OTHER PUBLICATIONS

International Search Report issued for PCT/CN2014/085465 dated May 26, 2015, in Chinese and English, 8 pages.

*Primary Examiner* — Jie Lei
(74) *Attorney, Agent, or Firm* — Hamre, Schumann, Mueller & Larson, P.C.

(57) ABSTRACT

An optical lens comprising a first lens (L1), a second lens (L2), a third lens (L3), a fourth lens (L4), and a fifth lens (L5) that are sequentially arranged on a common optical axis in the transmission direction of an incident light. Both the first lens (L1) and the fifth lens (L5) are negative meniscus lenses. Both the second lens (L2) and the third lens (L3) are positive meniscus lenses. The fourth lens (L4) is a biconvex lens. The optical lens is applicable in an optical system of a laser processing apparatus. When an employed processing wavelength is different from a monitoring wavelength, imaging color differences in a monitoring system can thus be eliminated, specifically, when a wavelength in the infrared range is employed as a laser processing wavelength while a red wavelength serves as the monitoring wavelength, improved imaging effects are provided in the monitoring system, thus ensuring the quality of laser processing.

4 Claims, 4 Drawing Sheets

(58) Field of Classification Search
USPC ....... 359/355–357, 682, 714, 746, 753, 763, 359/770
See application file for complete search history.

(56) References Cited

FOREIGN PATENT DOCUMENTS

| | | |
|---|---|---|
| CN | 203299442 | 11/2013 |
| CN | 203324563 | 12/2013 |
| CN | 103777327 | 5/2014 |
| JP | S57105715 | 7/1982 |
| JP | H3288112 | 12/1991 |
| KR | 20140056494 | 5/2014 |

* cited by examiner

OPTICAL LENS

FIELD OF THE INVENTION

The present disclosure relates to the field of optics, and more particularly relates to an optical lens applied to a laser processing.

BACKGROUND OF THE INVENTION

With the increasingly growing of the laser processing technology, a full monitoring of laser processing process (laser marking or laser cutting) is desired, so as to ensure the processing quality. Currently, the common monitoring method is to use CCD monitoring system to monitor the whole process. Compared with the conventional processing system in which focusing is performed with the naked eye at the beginning of processing, the CCD monitoring system can monitor the whole process. By monitoring the entire process, the parameters can be adjusted immediately in case of quality problems, thus ensuring the quality of processing.

The current CCD monitoring system has a "poor" vision at the wavelength in the far infrared light, and it has a higher sensitivity of the band in the red light region, thus the CCD monitoring system usually employ red light to work. However, when the system uses far-infrared wavelength laser to process, there is chromatic aberration in the imaging of the CCD monitoring system, which cannot faithfully reflect the processing in real-time.

SUMMARY OF THE INVENTION

Accordingly, it is necessary to provide an optical lens, which can be adapted to the working wavelength of the far-infrared region, while it can eliminate the imaging chromatic aberration in the monitoring system when using the monitoring wavelength in the red light region.

An optical lens includes, successively coaxially arranged along a transmission direction of an incident light: a first lens being a negative meniscus lens and having a first surface and a second surface; a second lens being a positive meniscus lens and having a third surface and a fourth surface; a third lens being a positive meniscus lens and having a fifth surface and a sixth surface; a fourth lens being a biconvex lens and having a seventh surface and a eighth surface; and a fifth lens being a negative meniscus lens and having a ninth surface and a tenth surface; wherein two surfaces of each lens are a light incident surface and a light outgoing surface of the lens, respectively; the first surface to the tenth surface are successively arranged along the transmission direction of the incident light; the first surface, the second surface, the third surface, the fourth surface, the fifth surface, the sixth surface, the eighth surface, and the ninth surface are convex surfaces towards the transmission direction of the incident light, and the seventh surface is a convex surface against the transmission direction of the incident light.

In one embodiment, the first surface has a radius of curvature of −56 mm±5%; the second surface has a radius of curvature of −300 mm±5%; the first lens has a central thickness of 6 mm±5%.

In one embodiment, the third surface has a radius of curvature of −110 mm±5%; the fourth surface has a radius of curvature of −80 mm±5%; the second lens has a central thickness of 12 mm±5%.

In one embodiment, the fifth surface has a radius of curvature of −4000 mm±5%; the sixth surface has a radius of curvature of −90 mm±5%; the third lens has a central thickness of 22 mm±5%.

In one embodiment, the seventh surface has a radius of curvature of 300 mm±5%; the eighth surface has a radius of curvature of −200 mm±5%; the fourth lens has a central thickness of 22 mm±5%.

In one embodiment, the ninth surface has a radius of curvature of −150 mm±5%; the tenth surface has a radius of curvature of ∞; the fifth lens has a central thickness of 4 mm±5%.

In one embodiment, an interval at a optical axis between the second surface of the first lens and the third surface of the second lens is 4 mm±5%; an interval at the optical axis between the fourth surface of the second lens and the fifth surface of the third lens is 1.5 mm±5%; an interval at the optical axis between the sixth surface of the third lens and the seventh surface of the fourth lens is 0.5 mm±5%; an interval at the optical axis between the eighth surface of the fourth lens and the ninth surface of the fifth lens is 10 mm±5%.

In one embodiment, the optical lens further includes a sixth lens being a planar lens; wherein the first lens, the second lens, the third lens, the fourth lens, the fifth lens, and the sixth lens are successively coaxially arranged along the transmission direction of the incident light.

In one embodiment, the sixth lens has a central thickness of 4 mm±5%.

In one embodiment, the sixth lens has an eleventh surface as a light incident surface and a twelfth surface as a light outgoing surface, an interval at a optical axis between the tenth surface of the fifth lens and the eleventh surface of the sixth lens is 2 mm±5%.

The above-mentioned optical lens can be applied to an optical system of a laser processing apparatus, which uses wavelength in the far-infrared region as the wavelength for laser processing. When using the red light wavelength as the monitoring wavelength, the monitoring system can achieve a better imaging effect, thus ensuring the quality of laser processing.

BRIEF DESCRIPTION OF THE DRAWINGS

These and other objects, advantages, purposes and features will become apparent upon review of the following specification in conjunction with the drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION OF THE EMBODIMENTS

Figure 1:
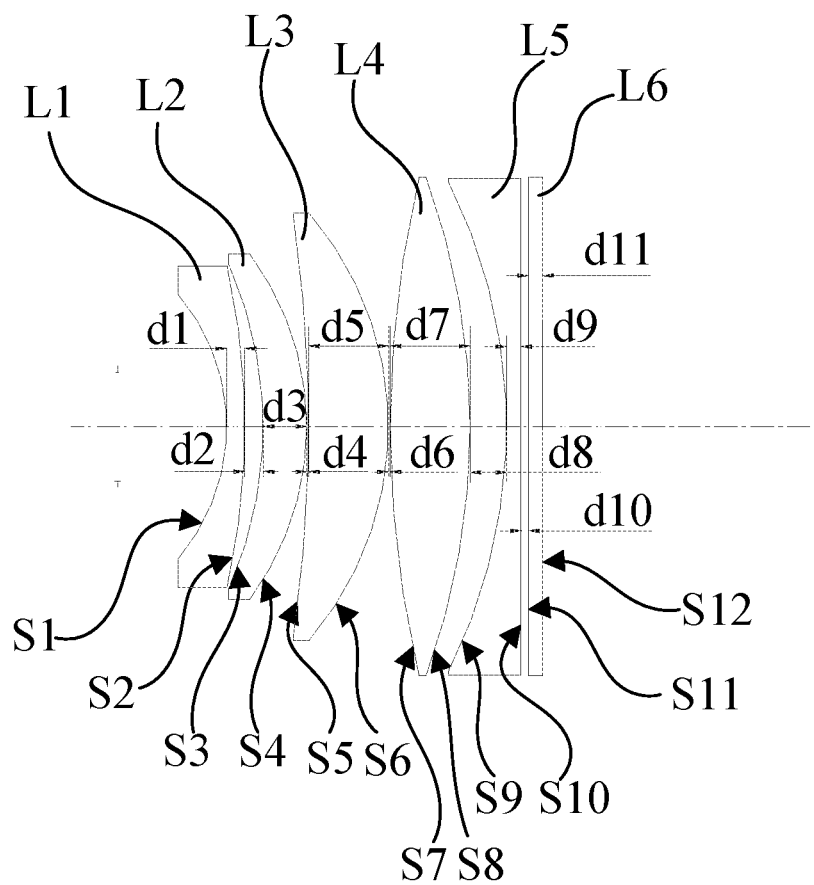
FIG. 1 is a schematic diagram of an optical lens according to one embodiment of the present invention.

Reference will now be made to the drawings to describe, in detail, embodiments of the present invention.

It should be noted that, in the present specification, the propagation direction of the light is from the left side to the right side of the drawing. The positive or negative curvature radius of the lens is determined by taking a relative positional relationship between an intersection point of the curved surface and the principal optical axis and a center of the spherical surface of the curved surface. If the center of the spherical surface is in the left of the intersection point, the radius of curvature has a negative value, if, on the other hand, the center of the spherical surface is in the right of the intersection point, the radius of curvature has a positive value. In addition, one side on the left of the lens is referred as the object side, and the other side on the right of the lens is referred as the image side. A positive lens is a lens in which the central thickness thereof is greater than the thickness of the edge, and a negative lens is a lens in which the central thickness thereof is less than the thickness of the edge.

FIG. 1 is a schematic diagram of an optical lens according to one embodiment of the present invention, and for illustrative purposes, only portions related to implementation of the disclosure are shown. The optical lens includes a first lens L1, a second lens L2, a third lens L3, a fourth lens L4, and a fifth lens L5, which are successively coaxially arranged along a transmission direction of the incident light.

The first lens L1 includes a first surface Si and a second surface S2, the second lens L2 includes a third surface S3 and a fourth surface S4, the third lens L3 has a fifth surface S5 and a sixth surface S6; the fourth lens L4 has a seventh surface S7 and a eighth surface S8; and the fifth lens L5 has a ninth surface S9 and a tenth surface S10. Two surfaces of each lens serve as a light incident surface and a light outgoing surface, respectively. The first surface S1 to the tenth surface S10 are successively arranged along the transmission direction of the incident light.

The first lens L1 is a negative meniscus lens. The first surface S1 of the first lens L1 is a convex surface towards the image, and the first surface S1 has a radius of curvature of −56 mm. The second surface S2 is a convex surface towards the image, and the second surface S2 has a radius of curvature of −300 mm. The first lens L1 has a central thickness d1 (i.e., a thickness of the first lens L1 along the principal optical axis) of 6 mm. It should be understood that, the parameters above are expected values, and certain tolerances can be allowed to exist. The tolerance for the foregoing parameters is 5%, i.e., those parameters can vary within ±5% of the expected values. In one embodiment, the first lens L1 is made of Nd 1.76:Vd27 (refractive index: dispersion coefficient).

The second L2 is a positive meniscus lens. The third surface S3 of the second lens L2 is a convex surface towards the image, and the third surface S3 has a radius of curvature of −110 mm. The fourth surface S4 is a convex surface towards the image, and the fourth surface S4 has a radius of curvature of −80 mm. The second lens L2 has a central thickness d3 of 12 mm. It should be understood that, the parameters above are expected values, and certain tolerances can be allowed to exist. The tolerance for the foregoing parameters is 5%, i.e., those parameters can vary within ±5% of the expected values. In one embodiment, the second lens L2 is made of Nd 1.69:Vd56.

The third lens L3 is a positive meniscus lens. The fifth surface S5 of the third lens L3 is a convex surface towards the image, and the fifth surface S5 has a radius of curvature of −400 mm. The sixth surface S6 is a convex surface towards the image, and the sixth surface S6 has a radius of curvature of −90 mm. The third lens L3 has a central thickness d5 of 22 mm. It should be understood that, the parameters above are expected values, and certain tolerances can be allowed to exist. The tolerance for the foregoing parameters is 5%, i.e., those parameters can vary within ±5% of the expected values. In one embodiment, the third lens L3 is made of Nd 1.69:Vd56.

The fourth lens L4 is a biconvex lens. The seventh surface S7 of the fourth lens L4 is a convex surface towards the object, and the seventh surface S7 has a radius of curvature of 300 mm. The eighth surface S8 is a convex surface towards the image, and the eighth surface S8 has a radius of curvature of −200 mm. The fourth lens L4 has a central thickness d7 of 22 mm. It should be understood that, the parameters above are expected values, and certain tolerances can be allowed to exist. The tolerance for the foregoing parameters is 5%, i.e., those parameters can vary within ±5% of the expected values. In one embodiment, the fourth lens L4 is made of Nd 1.69:Vd56.

The fifth lens L5 is a negative meniscus lens. The ninth surface S9 of the fifth lens L5 is a convex surface towards the image, and the ninth surface S9 has a radius of curvature of −150 mm. The tenth surface S10 is a plane with a radius of curvature of infinite (∞). The fifth lens L5 has a central thickness d9 of 4 mm. It should be understood that, the parameters above are expected values, and certain tolerances can be allowed to exist. The tolerance for the foregoing parameters is 5%, i.e., those parameters can vary within ±5% of the expected values. In one embodiment, the fifth lens L5 is made of Nd 1.6:Vd36.

Further, intervals between each lens are configured as follows. Specifically, an interval d2 at a optical axis between the light outgoing surface (the second surface S2) of the first lens L1 and the light incident surface (the third surface S3) of the second lens L2 is 4 mm with a tolerance of 5%, i.e., the interval d2 can vary within ±5% of the expected value.

An interval d4 at the optical axis between the light outgoing surface (the fourth surface S4) of the second lens L2 and the light incident surface (the fifth surface S5) of the third lens L3 is 0.5 mm with a tolerance of 5%, i.e., the interval d4 can vary within ±5% of the expected value.

An interval d6 at the optical axis between the light outgoing surface (the sixth surface S6) of the third lens L3 and the light incident surface (the seventh surface S7) of the fourth lens L4 is 0.5 mm with a tolerance of 5%, i.e., the interval d6 can vary within ±5% of the expected value.

An interval d8 at the optical axis between the light outgoing surface (the eighth surface S8) of the fourth lens L4 and the light incident surface (the ninth surface S9) of the fifth lens L5 is 10 mm with a tolerance of 5%, i.e., the interval d8 can vary within ±5% of the expected value.

In one embodiment, the optical lens further includes a sixth lens L6. The first lens L1, the second lens L2, the third lens L3, the fourth lens L4, the fifth lens L5, and the sixth lens L6 are successively coaxially arranged along the transmission direction of the incident light.

The sixth lens L6 includes an eleventh surface S11 serving as the light incident surface and a twelfth surface S12 serving as the light outgoing surface. As a protective component, the sixth lens L6 is a planar lens, thus the radii of curvature of the eleventh surface S11 and the twelfth surface S12 are infinite. The sixth lens L6 has a central thickness d11 of 4 mm. In addition, an interval d10 at the optical axis between the light outgoing surface (the tenth surface S10) of the fifth lens L5 and the light incident surface (the eleventh surface S11) of the sixth lens L6 is 2 mm. It should be understood that, the parameters above are expected values, and certain tolerances can be allowed to exist. The tolerance for the foregoing parameters is 5%, i.e., those parameters can vary within ±5% of the expected values. In one embodiment, the sixth lens L6 is made of Nd 1.5:Vd64.

The solution of the above embodiment will be more clearly described in the following brief descriptions:

The firth lens L1:
The first surface S1, radius of curvature of −56 mm;
The second surface S2, radius of curvature of −300 mm;
The central thickness, 6 mm;
The material: 1.76/27;
The second lens L2:
The third surface S3, radius of curvature of −110 mm;
The fourth surface S4, radius of curvature of −80 mm;
The central thickness, 12 mm;
The material: 1.69/56;
The distance between the first lens L1 and the second lens L2, 4 mm.
The third lens L3:
The fifth surface S5, radius of curvature of −400 mm;
The sixth surface S6, radius of curvature of −90 mm;
The central thickness, 22 mm;
The material: 1.69/56;
The distance between the second lens L2 and the third lens L3, 0.5 mm.
The fourth lens L4:
The seventh surface S7, radius of curvature of 300 mm;
The eighth surface S8, radius of curvature of −200 mm;
The central thickness, 22 mm;
The material: 1.69/56;
The distance between the third lens L3 and the fourth lens L4, 0.5 mm.
The fifth lens L5:
The ninth surface S9, radius of curvature of −150 mm;
The tenth surface S10, radius of curvature of ∞;
The central thickness, 4 mm;
The material: 1.6/36;
The distance between the fourth lens L4 and the fifth lens L5, 10 mm.
The sixth lens L6:
The eleventh surface S11, radius of curvature of ∞;
The twelfth surface S11, radius of curvature of ∞;
The central thickness, 4 mm;
The material: 1.5/64;
The distance between the fifth lens L5 and the sixth lens L6, 2 mm.

An optical system employing the foregoing optical lens can perform laser processing using the red or infrared light having a wavelength in a range of from 1064 to 630 nm as the light source. In a laser processing apparatus equipped with a CCD monitoring system using red light as a monitoring light source, the color aberration in the CCD image can be avoided due to this optical lens, thus obtaining a better imaging effect and a better real-time monitoring of the processing.

Next, the optical effects of the laser processing apparatus having the optical lens are explained with reference to FIG. 2 to FIG. 4 by choosing the far-infrared laser ($\lambda$=1064 nm) and the visible illumination light ($\lambda$=632 nm).

The specific parameters of the optical lens are as follows: f=210 mm; Φ=30 mm; marking range: A=130*130 mm², where f is the focal length of the optical lens, and Φ is the entrance pupil diameter.

Figure 2:
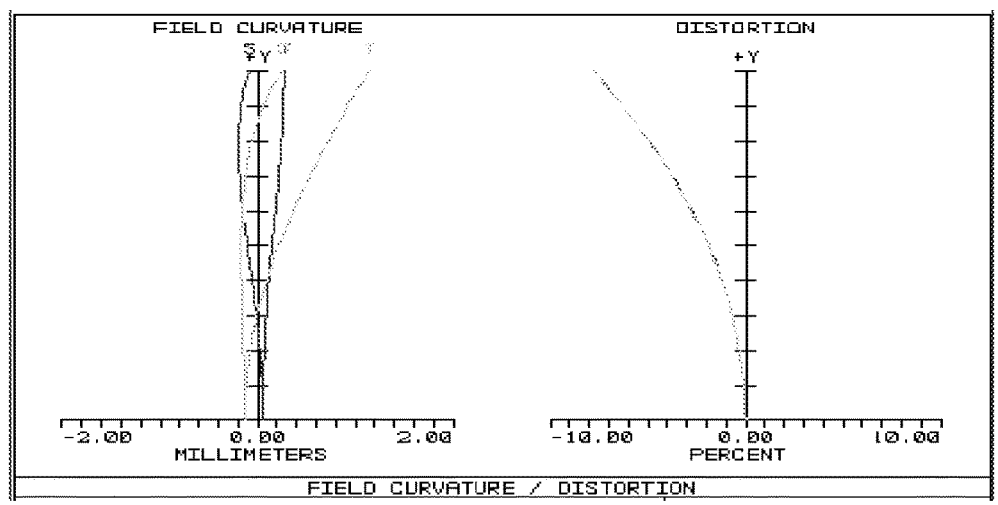
FIG. 2 is a graphic diagram showing field curvature and distortion of the optical lens of FIG. 1.

FIG. 2 is a graphic diagram showing field curvature and distortion of the optical lens. As can be seen from FIG. 2 that, the axial chromatic aberration ΔCI=0.15-0.2, the magnification chromatic aberration ΔCII≈0, which are ideal.

Figure 3:
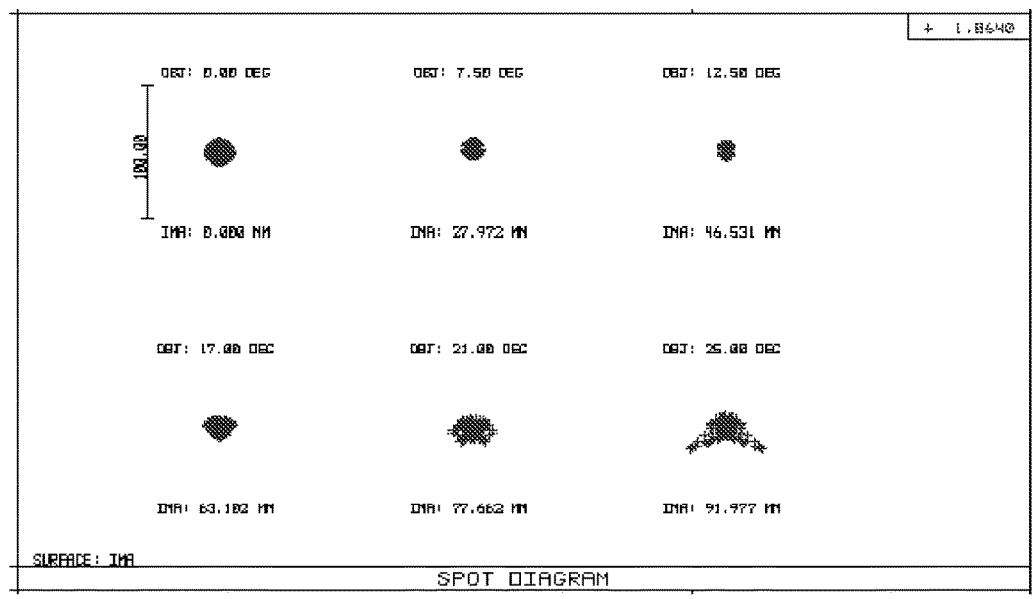
FIG. 3 is a graphic diagram showing a dispersion pattern of the optical lens of FIG. 1.

FIG. 3 is a geometrical aberration diagram of the lens. As can be seen from FIG. 3 that, the geometric dispersion circle in all of the fields of view is about 0.01 mm, which is ideal.

Figure 4:
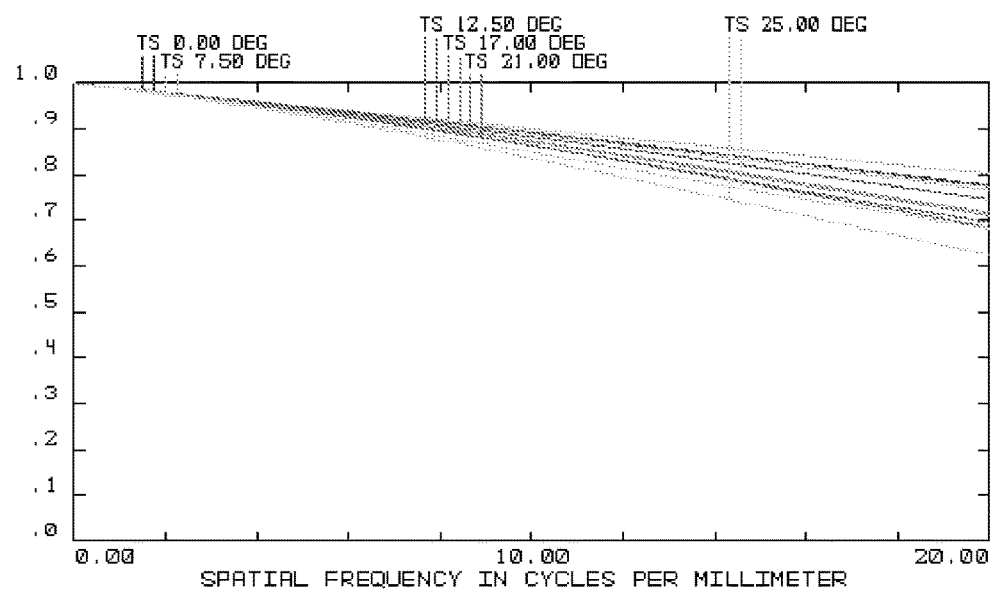
FIG. 4 is a graphic diagram showing a modulation transfer function (M.T.F) of the optical lens of FIG. 1.

FIG. 4 is a graphic diagram showing a modulation transfer function (M.T.F) of the optical lens. As can be seen from FIG. 4 that, when the resolution reaches 20 line pairs, M.T.F is 0.6, which is fully able to meet the requirements of laser processing.

By using the optical lens according to the embodiment, light with a working band such as $\lambda$=1064 nm and the CCD visible band $\lambda$=632 nm can be focused on the same image plane, such that the whole laser processing procedure can be faithfully reflected in the CCD target plane, the entire marking process can be monitored to ensure that the entire marking process is accurate.

Although the description is illustrated and described herein with reference to certain embodiments, the description is not intended to be limited to the details shown. Modifications may be made in the details within the scope and range equivalents of the claims.

What is claimed is:
1. An optical lens system, comprising, successively coaxially arranged along a transmission direction of an incident light:
   a first lens being a negative meniscus lens and having a first surface and a second surface;
   a second lens being a positive meniscus lens and having a third surface and a fourth surface;
   a third lens being a positive meniscus lens and having a fifth surface and a sixth surface;
   a fourth lens being a biconvex lens and having a seventh surface and a eighth surface; and
   a fifth lens being a negative meniscus lens and having a ninth surface and a tenth surface,
   wherein two surfaces of each lens are a light incident surface and a light outgoing surface of the lens, respectively; the first surface to the tenth surface are successively arranged along the transmission direction of the incident light; the first surface, the second surface, the third surface, the fourth surface, the fifth surface, the sixth surface, the eighth surface, and the ninth surface are convex surfaces towards the transmission direction of the incident light, and the seventh surface is a convex surface against the transmission direction of the incident light, and
   wherein the optical lenses system is configured to focus a plurality of incidental lights with various wavelengths on a same image plane;
   wherein the first surface has a radius of curvature of −56 mm±5%; the second surface has a radius of curvature of −300 mm±5%; the first lens has a central thickness of 6 mm±5%;
   wherein the third surface has a radius of curvature of −110 mm±5%; the fourth surface has a radius of curvature of −80 mm±5%; the second lens has a central thickness of 12 mm±5%;
   wherein the fifth surface has a radius of curvature of −4000 mm±5%; the sixth surface has a radius of curvature of −90 mm±5%; the third lens has a central thickness of 22 mm±5%
   wherein the seventh surface has a radius of curvature of 300 mm±5%; the eighth surface has a radius of curvature of −200 mm±5%; the fourth lens has a central thickness of 22 mm±5%;

wherein the ninth surface has a radius of curvature of −150 mm±5%; the tenth surface has a radius of curvature of ∞; the fifth lens has a central thickness of 4 mm±5%;

wherein an interval at a optical axis between the second surface of the first lens and the third surface of the second lens is 4 mm±5%; an interval at the optical axis between the fourth surface of the second lens and the fifth surface of the third lens is 1.5 mm±5%; an interval at the optical axis between the sixth surface of the third lens and the seventh surface of the fourth lens is 0.5 mm±5%; an interval at the optical axis between the eighth surface of the fourth lens and the ninth surface of the fifth lens is 10 mm±5%.

2. The optical lens system according to claim 1, further comprising a sixth lens being a planar lens; wherein the first lens, the second lens, the third lens, the fourth lens, the fifth lens, and the sixth lens are successively coaxially arranged along the transmission direction of the incident light.

3. The optical lens system according to claim 2, wherein the sixth lens has a central thickness of 4 mm±5%.

4. The optical lens system according to claim 2, wherein the sixth lens has an eleventh surface as a light incident surface and a twelfth surface as a light outgoing surface, an interval at a optical axis between the tenth surface of the fifth lens and the eleventh surface of the sixth lens is 2 mm±5%.

* * * * *